US009575314B2

(12) United States Patent
Araki

(10) Patent No.: US 9,575,314 B2
(45) Date of Patent: Feb. 21, 2017

(54) IMAGE FORMING APPARATUS HAVING POLYGON MIRROR FORMED WITH A PLURALITY OF REFLECTION SURFACES

(71) Applicant: CANON KABUSHIKI KAISHA, Tokyo (JP)

(72) Inventor: Go Araki, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 448 days.

(21) Appl. No.: 13/685,264

(22) Filed: Nov. 26, 2012

(65) Prior Publication Data
US 2013/0141510 A1 Jun. 6, 2013

(30) Foreign Application Priority Data

Dec. 5, 2011 (JP) ................................. 2011-266272

(51) Int. Cl.
B41J 2/47 (2006.01)
G02B 26/12 (2006.01)

(52) U.S. Cl.
CPC .............. G02B 26/124 (2013.01); B41J 2/471 (2013.01); G02B 26/127 (2013.01)

(58) Field of Classification Search
CPC ................. B41J 2/44; B41J 2/45; B41J 2/455; B41J 2/471
USPC ................. 347/118, 129, 144, 232, 235, 250
See application file for complete search history.

(56) References Cited

U.S. PATENT DOCUMENTS

| | | | |
|---|---|---|---|
| 4,920,430 A * | 4/1990 | Isono et al. ................... | 358/481 |
| 6,578,161 B1 | 6/2003 | Kohtani et al. | |
| 7,642,724 B2 | 1/2010 | Muto et al. | |
| 8,027,056 B2 | 9/2011 | Kaji ............................... | 358/1.2 |
| 2002/0051137 A1* | 5/2002 | Ema et al. ..................... | 358/1.1 |
| 2004/0100548 A1 | 5/2004 | Seki ............................... | 347/119 |
| 2004/0160506 A1 | 8/2004 | Maeda .......................... | 347/129 |
| 2007/0115339 A1* | 5/2007 | Matsuzaki et al. ............ | 347/118 |
| 2008/0239336 A1* | 10/2008 | Tanabe et al. ................. | 358/1.7 |
| 2008/0267653 A1 | 10/2008 | Ushio ............................. | 399/77 |
| 2009/0009819 A1* | 1/2009 | Kaji .............................. | 358/447 |

FOREIGN PATENT DOCUMENTS

| | | |
|---|---|---|
| JP | 2000-238342 | 9/2000 |
| JP | 2003-260813 | 9/2003 |
| JP | 2004-066605 | 3/2004 |

(Continued)

Primary Examiner — Kristal Feggins
Assistant Examiner — Kendrick Liu
(74) Attorney, Agent, or Firm — Fitzpatrick, Cella, Harper & Scinto

(57) ABSTRACT

An image forming apparatus includes: a polygon mirror formed with a plurality of reflection surfaces, and a generating device configured to generate a pulse signal required to modulate a laser beam based on image data. The generating device is further configured to generate a pulse signal by inserting or deleting a pulse signal having a width smaller than a width of a pulse signal corresponding to one pixel of the image data into or from a pulse signal corresponding to the image data based on information associated with deviation amounts between lengths of scanning lines formed by the plurality of reflection surfaces and a reference value, so as to adjust the lengths of the scanning lines formed by the plurality of reflection surfaces to be closer to the reference value.

17 Claims, 13 Drawing Sheets

(56) References Cited

FOREIGN PATENT DOCUMENTS

| | | |
|---|---|---|
| JP | 2004-333631 | 11/2004 |
| JP | 2004-351908 | 12/2004 |
| JP | 2005096351 A * | 4/2005 ............... B41J 2/44 |
| JP | 2007-144667 | 6/2007 |
| JP | 2008-290447 | 12/2008 |
| JP | 2009-017396 | 1/2009 |
| JP | 4462917 B | 5/2010 |

\* cited by examiner

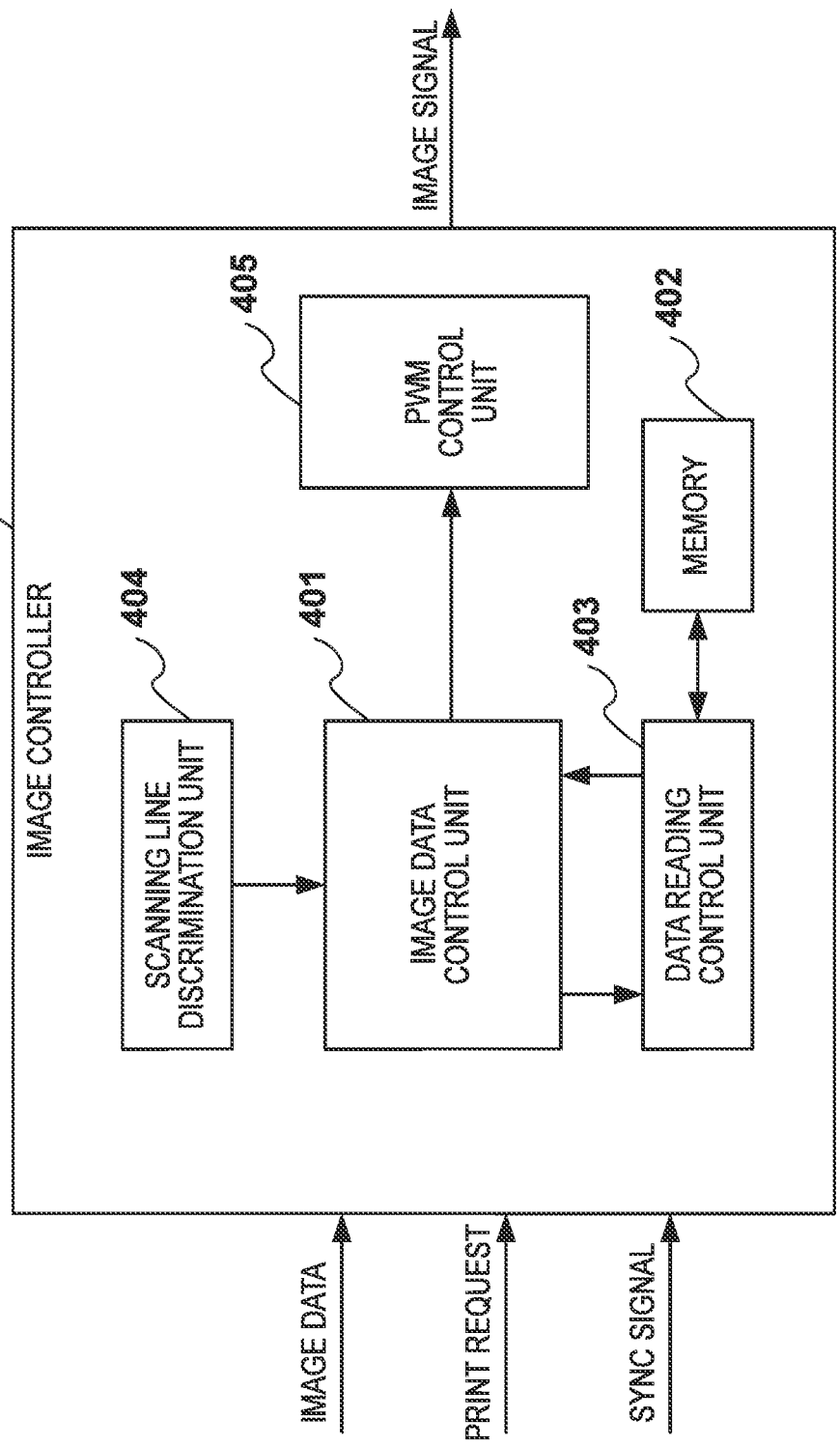

FIG. 5A
OFF 
ON 
FIG. 5B
OFF 
ON 
MAIN SCAN DIRECTION →

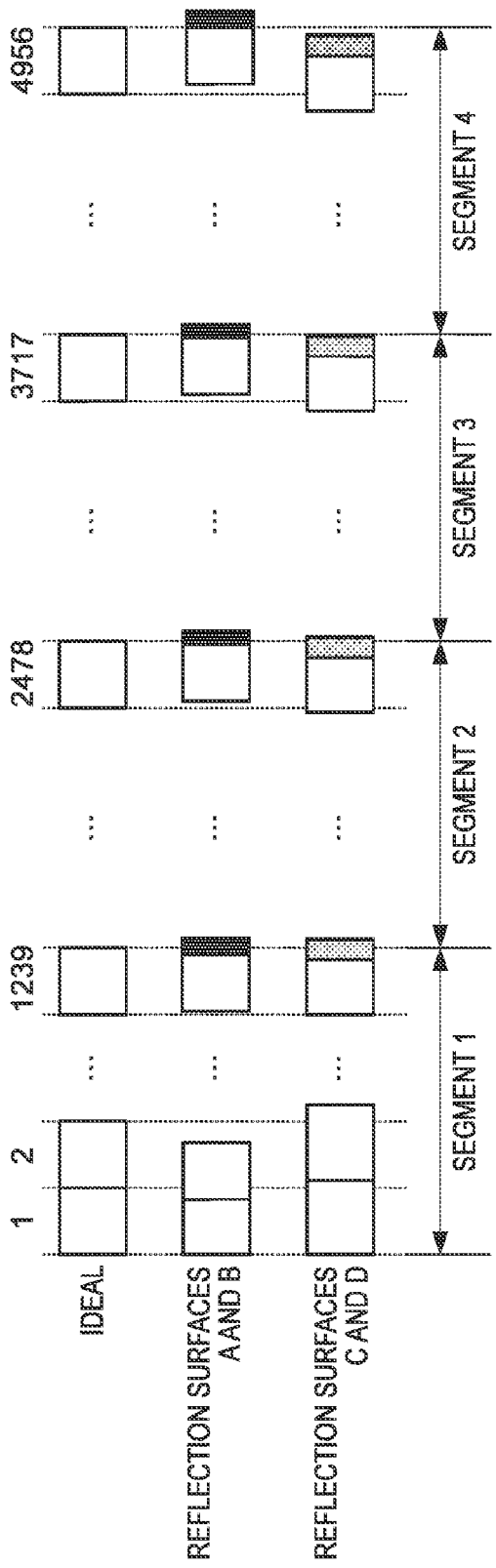

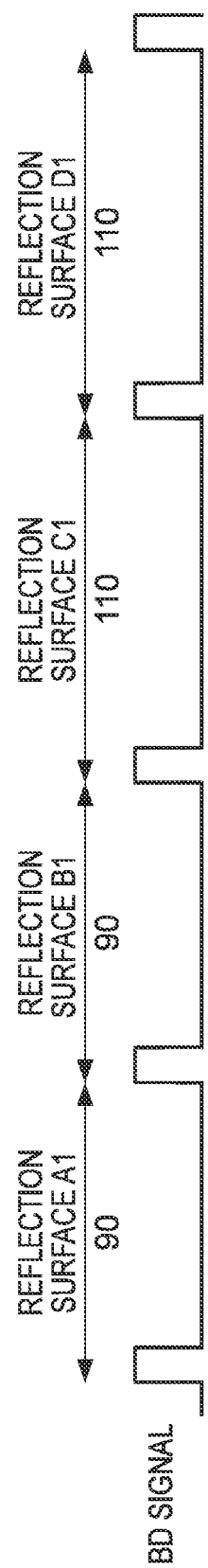

ACTUAL DOT INTERVAL

FIG. 12A

| LASER BEAM | MAGNIFICATION | NUMBER OF PULSES TO BE INSERTED/DELETED |
|---|---|---|
| 930 | 1 | NONE |
| 931 | 1.000026 | DELETE 2 PULSES |

FIG. 12B

| REFLECTION SURFACE | NUMBER OF PULSES TO BE INSERTED/DELETED |
|---|---|
| REFLECTION SURFACE A | INSERT 4 PULSES |
| REFLECTION SURFACE B | INSERT 4 PULSES |
| REFLECTION SURFACE C | DELETE 4 PULSES |
| REFLECTION SURFACE D | DELETE 4 PULSES |

FIG. 12C

| REFLECTION SURFACE | LASER BEAM | NUMBER OF PULSES TO BE INSERTED/DELETED |
|---|---|---|
| REFLECTION SURFACE A | 930 | INSERT 4 PULSES |
| | 931 | INSERT 2 PULSES |
| REFLECTION SURFACE B | 930 | INSERT 4 PULSES |
| | 931 | INSERT 2 PULSES |
| REFLECTION SURFACE C | 930 | DELETE 4 PULSES |
| | 931 | DELETE 6 PULSES |
| REFLECTION SURFACE D | 930 | DELETE 4 PULSES |
| | 931 | DELETE 6 PULSES |

IMAGE FORMING APPARATUS HAVING POLYGON MIRROR FORMED WITH A PLURALITY OF REFLECTION SURFACES

BACKGROUND OF THE INVENTION

Field of the Invention

The present invention relates to an image forming apparatus adopting an electrophotography method such as a copying machine, printer, facsimile apparatus, or plate making system.

Description of the Related Art

In an image forming apparatus, toner images of respective colors (for example, cyan, magenta, yellow, and black) are formed using laser beams, and the toner images of these colors are superposed with each other, thus forming an image. In this case, when the toner images of the respective colors have different sizes, color misregistration occurs. To avoid such problem, Japanese Patent Laid-Open No. 2000-238342 discloses an arrangement in which a slight delay is inserted or deleted into or from an image data stream, thereby adjusting a laser write frequency.

However, in the arrangement described in Japanese Patent Laid-Open No. 2000-238342, tolerances of respective reflection surfaces of a rotating polygon mirror are not corrected, thus causing length variations of scanning lines formed by the respective reflection surfaces. As a result, moiré that brings visual discomfort may be generated due to an interference between cycles of the rotating polygon mirror and a screen. For this reason, a limitation which inhibits use of a screen that readily causes moiré with respect to the cycle of the rotating polygon mirror has to be set.

SUMMARY OF THE INVENTION

The present invention provides an image forming apparatus which suppresses length variations of scanning lines formed by respective reflection surfaces of a polygon mirror.

According to one aspect of the present invention, an image forming apparatus includes a photosensitive member; scanning device including a light source configured to emit a laser beam, and a polygon mirror formed with a plurality of reflection surfaces, and configured to scan the photosensitive member with the laser beam by reflecting the laser beam by the reflection surfaces of the rotating polygon mirror; and a generating device configured to generate a pulse signal required to modulate the laser beam based on image data, and output the pulse signal to the scanning device. The generating device is further configured to generate a pulse signal by inserting or deleting a pulse signal having a width smaller than a width of a pulse signal corresponding to one pixel of the image data into or from a pulse signal corresponding to the image data based on information associated with deviation amounts between lengths of scanning lines formed by the plurality of reflection surfaces and a reference value, so as to adjust the lengths of the scanning lines formed by the plurality of reflection surfaces to be closer to the reference value.

Further features of the present invention will become apparent from the following description of exemplary embodiments with reference to the attached drawings.

BRIEF DESCRIPTION OF THE DRAWINGS

FIG. 4 is a block diagram of an image controller according to an embodiment;

FIGS. 5A and 5B are explanatory views of a minimum width pulse of a PWM signal;

FIGS. 7A to 7C are explanatory views of a correction method of length variations of the scanning lines formed by the polygon mirror;

FIG. 8 is an explanatory view of determination of reflection surfaces used to scan the scanning lines;

FIGS. 12A to 12C are explanatory views of a correction method of scanning lines according to an embodiment using a plurality of laser beams.

DESCRIPTION OF THE EMBODIMENTS (First Embodiment)

Figure 1:
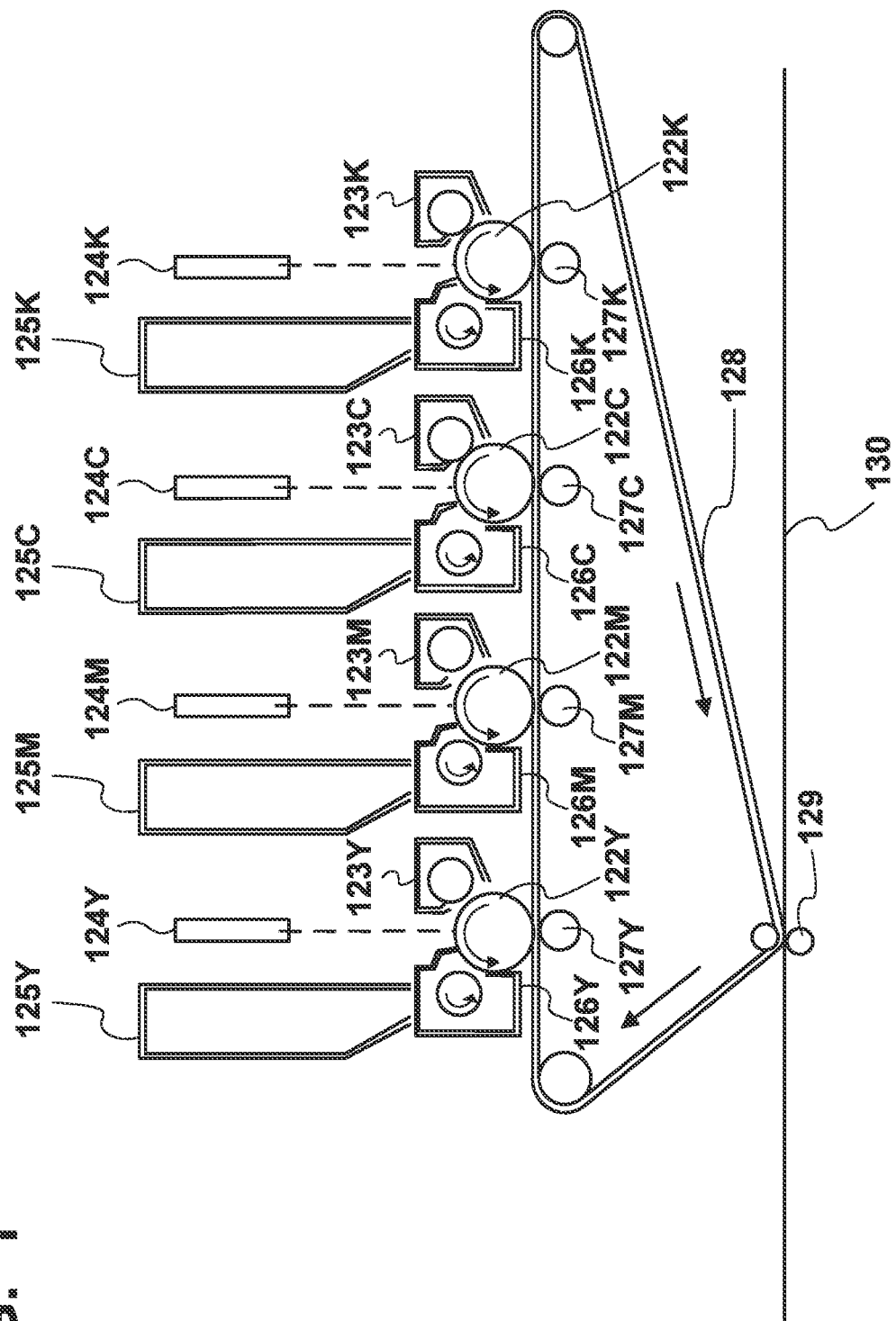
FIG. 1 is a view showing the arrangement of an image forming unit of an image forming apparatus according to an embodiment.

FIG. 1 is a view showing the arrangement of an image forming unit of an image forming apparatus according to this embodiment. Note that components which are not required to understand embodiments in the following figures are not shown for the sake of simplicity. Letters Y, M, C, and K added to reference numerals in FIG. 1 indicate that those members respectively correspond to yellow, magenta, cyan, and black. Note that in the following description, reference numerals without letters Y, M, C, and K are used when colors need not be distinguished from each other.

A charging unit 123 charges a corresponding photosensitive member 122, and a scanning unit 124 scans the photosensitive member 122 as an image carrier with a laser beam according to an image to be formed, thereby forming an electrostatic latent image. A developing unit 126 has a toner of a corresponding color, and develops the electrostatic latent image on the corresponding photosensitive member 122 with the toner, thus forming a toner image. A toner container 125 has a toner of a corresponding color, and supplies the toner to the corresponding developing unit 126. A primary transfer unit 127 transfers the toner image on the photosensitive member 122 onto an intermediate transfer belt 128. At this time, toner images of respective colors are transferred onto the intermediate transfer belt 128 while being superposed with each other, thereby forming a color image. The toner images transferred onto the intermediate transfer belt 128 are transferred onto a print material conveyed along a convey path 130 by a secondary transfer unit 129, and the toner images transferred onto the print material are then fixed by a fixing unit (not shown).

Figure 2:
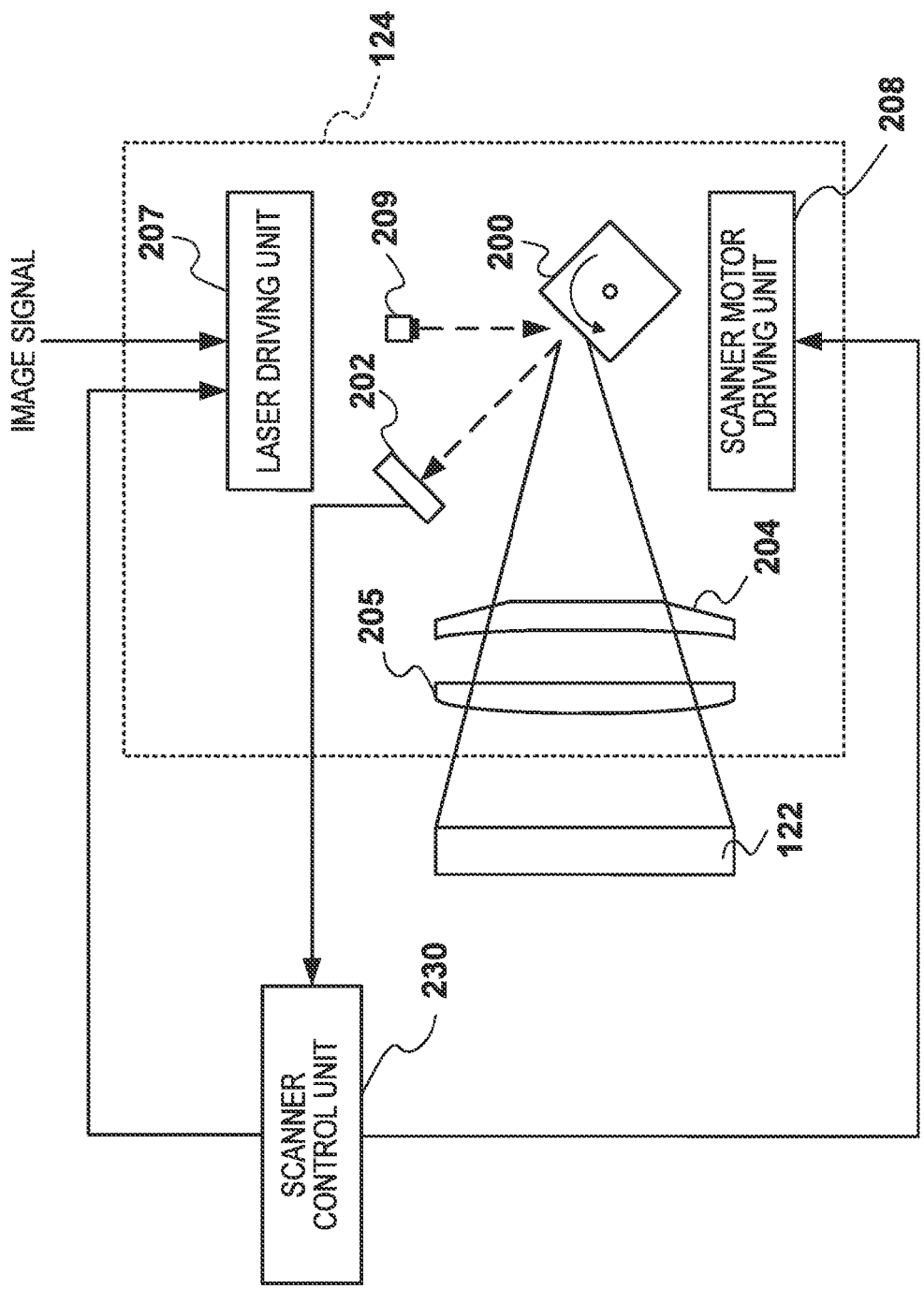
FIG. 2 is a view showing the arrangement of a scanning unit according to an embodiment.

The scanning unit 124 will be described below with reference to FIG. 2. A laser driving unit 207 of the scanning unit 124 executes emission control of a semiconductor laser 209 based on an image signal as a pulse signal to be received under the control of a scanner control unit 230. A scanner motor driving unit 208 controls a rotation speed and rotation phase of a rotating polygon mirror 200 under the control of the scanner control unit 230. A laser beam emitted by the semiconductor laser 209 as a light source is reflected and deflected by each reflection surface of the polygon mirror 200 having a plurality of reflection surfaces, thereby scanning the photosensitive member 122. In this manner, the polygon mirror 200 functions as a deflecting unit. Note that fθ lenses 204 and 205 are inserted to correct a scanning speed on the photosensitive member 122 of the laser beam deflected by the polygon mirror 200 to a constant speed. A photosensor 202 as a photodetection unit is arranged to detect a scanning timing of the photosensitive member 122 by the laser beam, and outputs a signal indicating a detection state of the laser beam to the scanner control unit 230 as a sync signal.

The scanner control unit 230 controls the polygon mirror 200 to rotate at a predetermined speed in an image forming mode. More specifically, the scanner control unit 230 controls the scanner motor driving unit 208 so that the rotation speed of the polygon mirror 200, which is determined based on the detection period of the sync signal transmitted from the optical sensor 202, matches a target value. Also, the scanner control unit 230 corrects the rotation phase of the polygon mirror 200 so that the sync signal is detected at desired timings, so as to accurately superpose respective colors.

Figure 3:
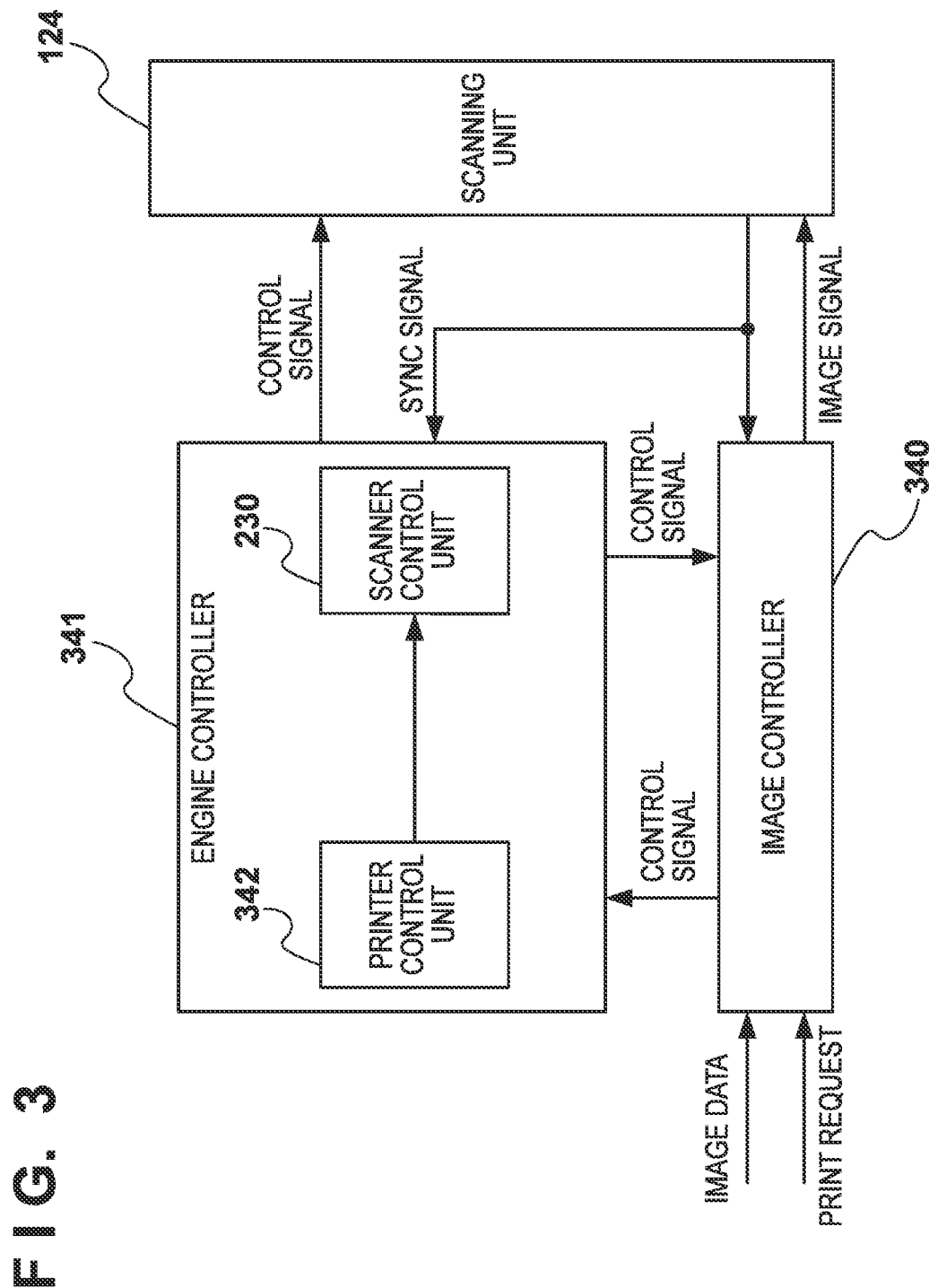
FIG. 3 is a block diagram of a control system of the image forming apparatus according to an embodiment.

Control processing in the image forming mode will be described below with reference to FIG. 3. An image controller 340 receives a print request and image data, which are transmitted via a host I/F unit (not shown), and transmits raster image data to the scanning unit 124 as an image signal. An engine controller 341 executes actuator control and status management of the image forming unit.

Upon reception of a control signal which includes the print request and is transmitted from the image controller 340, a printer control unit 342 controls the scanner control unit 230 which controls the scanning unit 124. Furthermore, the printer control unit 342 controls start and stop of actuators of the intermediate transfer belt 128, photosensitive member 122, and the like. The scanner control unit 230 controls the scanner motor driving unit 208 of the scanning unit 124, so that the sync signal is output from the scanning unit 124 at a predetermined timing. Note that the image controller 340 outputs an image signal in accordance with a timing of the sync signal.

Subsequently, the image controller 340 will be described below with reference to FIG. 4. A memory 402 stores the number of minimum width pulses to be inserted/deleted with respect to the respective reflection surfaces of the polygon mirror 200 or deviation amounts of lengths of scanning lines of scans by the respective reflection surfaces from a reference value, as will be described in detail later. A scanning line discrimination unit 404 determines a reflection surface of the polygon mirror 200 used to deflect a laser beam in each scan. A data reading control unit 403 reads information held by the memory 402. An image data control unit 401 outputs the number of minimum width pulses to be inserted/deleted or the deviation amount from the reference value, which corresponds to the reflection surface of the polygon mirror 200 determined by the scanning line discrimination unit 404, and image data to a PWM control unit 405. The PWM control unit 405 generates a pulse width modulation (PWM) signal as a pulse signal required to modulate the semiconductor laser 209 based on the received image data and deviation amount, and transfers the PWM signal to the scanning unit 124 as an image signal. Note that the image data control unit 401 also executes a series of image processes such as color conversion processing, shading correction, and halftone processing.

The PWM signal which is output from the image controller 340 to the scanning unit 124 will be described below with reference to FIGS. 5A and 5B. For example, assuming that an output resolution is 600 DPI, a width of each pixel shown in FIG. 5A is about 0.042 mm. For example, in PWM control of 2 bits, that is, four values, one pixel width is divided into three in the main scan direction, as shown in FIG. 5B, to improve the resolution of the main scan direction. Each part obtained by dividing one pixel in the PWM control will be referred to as a pixel piece hereinafter. Also, each pulse of the PWM signal as a width corresponding to each pixel piece will be referred to as a minimum width pulse hereinafter. That is, each divided part of a pixel, which is divided into three, as shown in FIG. 5B, is a pixel piece, and a pulse having a width corresponding to this pixel piece is a minimum width pulse. In this manner, the PWM signal includes ON or OFF of the minimum width pulses.

Figure 6:
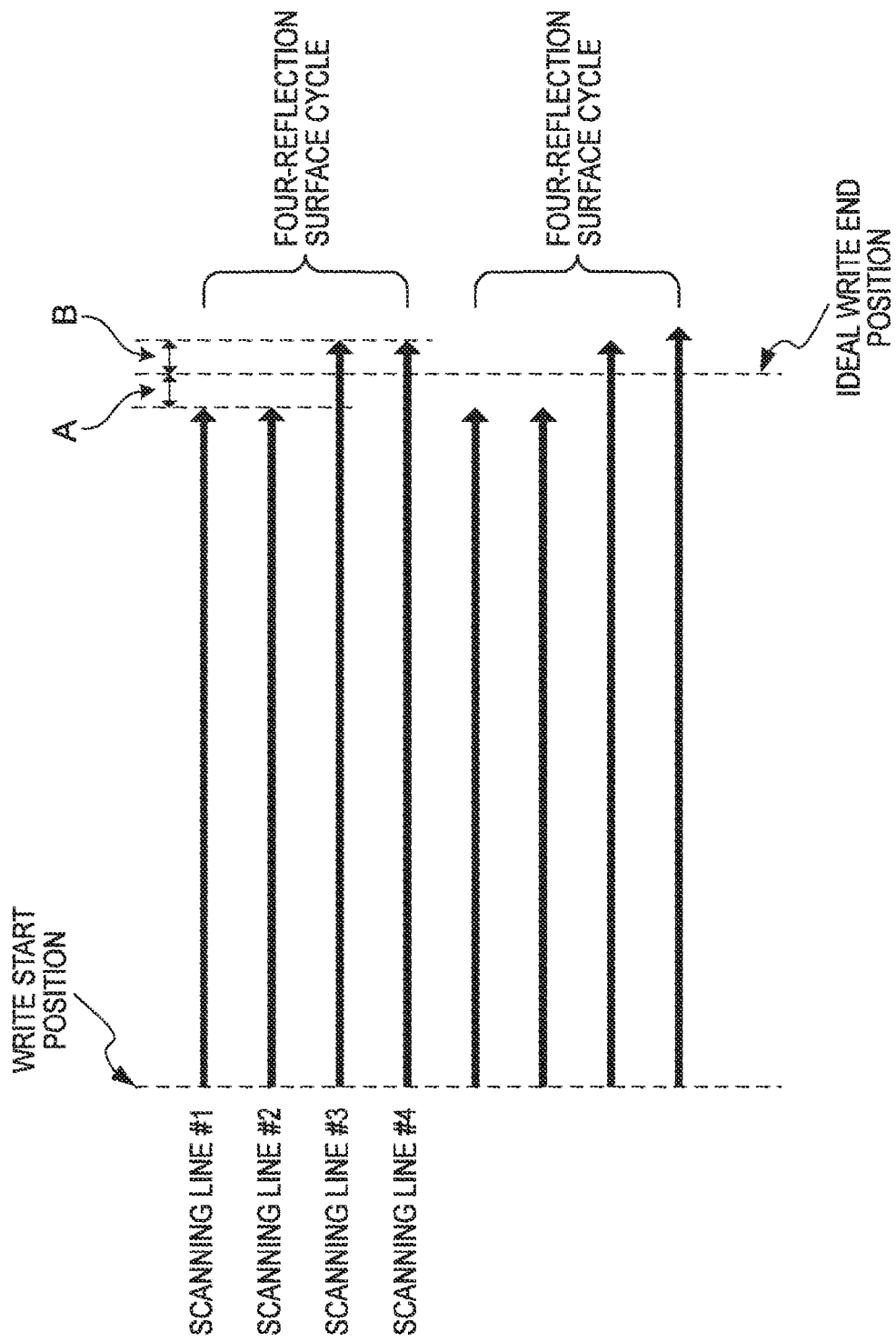
FIG. 6 is an explanatory view of changes in length of scanning lines formed by a polygon mirror.

Generation of moiré by the polygon mirror 200 will be described below. Note that the following description will be given under the assumption that the polygonal mirror 200 has four reflection surfaces. Each reflection surface of the polygon mirror 200 is cut so that respective reflection surfaces have the same size at the time of manufacture, but sizes of the respective reflection surfaces are deviated due to the working precision, attachment precision, and the like. Due to this deviation, as shown in FIG. 6, lengths of scanning lines in the main scan direction are deviated from a reference value as an ideal length of a scanning line. In the polygon mirror 200 with four reflection surfaces in this example, this deviation from the reference value is repeated at a cycle of four scanning lines in the sub-scan direction. Note that in FIG. 6, a length of scanning lines #1 and #2 is shorter by a value A than an ideal write end position as the reference value, and a length of scanning lines #3 and #4 is longer by a value B than the reference value. This length variation in the main scan direction causes fluctuations of dots of a screen. Such dot fluctuations, that is, dot density variations cause moiré, and visual discomfort is brought at a cycle of high visual characteristic sensitivity.

A moiré reduction method according to this embodiment will be described below with reference to FIGS. 7A to 7C. Note that the following description will be given under the assumption that the resolution is 600 DPI, the number of reflection surfaces of the polygon mirror 200 is 4, and the bit width of the PWM control is 4 bits, that is, one pixel is divided into 15 pixel pieces. Also, assume that an electrostatic latent image is formed by one laser beam, and a size of a print material is A4. Therefore, a minimum width pulse is a pulse having a width of 25.4/(600*15)≈0.0028 mm since 1 inch=25.4 mm. Furthermore, assume that when scans are made using reflection surfaces A and B of the polygon mirror 200, a scanning line length becomes shorter by 0.0105 mm than the reference value, and when scans are made using reflection surfaces C and D, a scanning line length becomes longer by 0.0105 mm than the reference value. Note that the reflection surfaces A and C are those which oppose each other, and the reflection surfaces B and D are those which oppose each other. In this case, 0.0105 mm corresponds to an interval of about 3.7 minimum width pulses. This value is rounded off to an integer to calculate the number of minimum width pulses to be inserted/deleted. Note that a method of truncating or rounding out decimal fractions may be used in place of rounding off. That is, when scans are made using the reflection surfaces A and B, the PWM control unit 405 inserts a pulse signal having a width equal to four minimum width pulses into a PWM signal corresponding to image data. On the other hand, when scans are made using the reflection surfaces C and D, the PWM control unit 405 deletes a pulse signal having a width equal to four minimum width pulses from a PWM signal corresponding to image data. With this arrangement, the scanning line lengths are corrected to be closer to the reference value; that is, an ideal length.

In this embodiment, the number of minimum width pulses to be inserted/deleted is measured in advance so as to correct deviation amounts of scanning line lengths to be closer to the reference value, and information indicating the number of minimum width pulses to be inserted/deleted is saved in the memory 402, as shown in FIG. 7A. In other words, information indicating a width of a pulse signal to be inserted/deleted is saved in the memory 402. Then, the image controller 340 determines the number of minimum width pulses to be inserted/deleted; that is, the width of a PWM signal to be inserted/deleted from the information shown in FIG. 7A based on the reflection surface of the polygon mirror 200, which is discriminated by the scanning line discrimination unit 404 as a reflection surface used to deflect a laser beam in each scan. Then, the PWM control unit 405 generates a PWM signal by inserting or deleting a PWM signal corresponding to the determined width into or from a PWM signal corresponding to image data, and outputs the generated PWM signal to the scanning unit 124. Note that information indicating a deviation amount (first deviation amount) of a scanning line length from the reference value may be saved, as shown in FIG. 7B, and the image controller 340 may calculate the number of minimum width pulses to be inserted/deleted, that is, the width of a PWM signal to be inserted/deleted.

Note that in order to avoid insertion/deletion positions of minimum width pulses from being concentrated, the PWM control unit 405 inserts/deletes minimum width pulses at positions which are dispersed as much as possible on scanning lines. For example, assume that the number of pixels of one scanning line is 4956 in consideration of a margin or the like, as shown in FIG. 7C. In this case, the PWM control unit 405 divides one scanning line into four segments equal to the number of minimum width pulses to be inserted/deleted. At this time, the PWM control unit 405 can divide one scanning line into segments each including the nearly equal number of pixels or minimum width pulses. Then, the PWM control unit 405 inserts or deletes one minimum width pulse from each segment. Note that in FIG. 7C, hatched portions of the reflection surfaces A and B indicate minimum width pulses to be inserted, and those of the reflection surfaces C and D indicate minimum width pulses to be deleted. Note that a value (high/low) of a minimum width pulse to be inserted assumes an arbitrary value. In FIG. 7C, the PWM control unit 405 inserts/deletes a minimum width pulse at the last pixel of each segment, but it can insert/delete a minimum width pulse at another position. Also, this position may be randomly selected from each segment. In this manner, a PWM signal is generated by inserting/deleting minimum width pulses as many as the number of minimum width pulses to be inserted/deleted corresponding to each reflection surface of the polygon mirror 200 from a PWM signal corresponding to image data for a scan by that reflection surface. Then, a laser beam to be deflected by that reflection surface is ON/OFF-controlled using the generated PWM signal, thereby preventing density variations between dots, and reducing moiré. Note that at this time, for example, a scanning line is divided into segments in each of which a deviation amount can be compensated for by inserting/deleting one minimum width pulse, and the scanning line length is adjusted to have this segment as a unit, thereby reducing a deviation amount of each pixel from each individual ideal pixel position. Insertion and deletion of minimum width pulses will be referred to as pixel piece insertion/deletion hereinafter. Note that information shown in FIG. 7A or 7B is set at the time of factory delivery. However, these pieces of information can be corrected according to variations due to aging and the like.

Note that a PWM signal to be output to the scanning unit 124 is generated by inserting/deleting minimum width pulses according to a deviation amount into/from a PWM signal corresponding to image data. This specifies only a PWM signal to be output to the scanning unit 124, but does not specify a PWM signal generation method. That is, for example, as described above, the PWM control unit 405 can generate a PWM signal to be output to the scanning unit 124 by inserting/deleting minimum width pulses according to a deviation amount into/from a PWM signal corresponding to image data, as described above using FIGS. 7A to 7C. Or the image data control unit 401 shown in FIG. 4 can correct image data in advance in consideration of pixel piece insertion/deletion based on a deviation amount of the reflection surface of the polygon mirror 200 used in each scan, and can output the corrected image data to the PWM control unit 405. In this case, the PWM control unit 405 can generate a PWM signal to be output to the scanning unit 124 by simply converting the corrected image data from the image data control unit 401 into a PWM signal.

In either case, the number of minimum width pulses of a PWM signal to be output to the scanning unit 124 is increased/decreased by the number of minimum width pulses corresponding to a deviation amount of the reflection surface of the polygon mirror 200 used in each scan. In other words, a PWM signal for each scan is temporally shortened or extended by a width of minimum width pulses corresponding to the deviation amount of the reflection surface of the polygon mirror 200 used in that scan. Then, the image controller 340 can decide to disperse pulse positions to be increased/decreased.

Subsequently, the discrimination method of the reflection surface of the polygon mirror 200 used in a scan of each scanning line by the scanning line discrimination unit 404 will be described below. For example, assume that when all the reflection surfaces of the polygon mirror 200 are ideal, a count value of predetermined clocks at detection intervals of a laser beam by the photosensor 202 shown in FIG. 2 is 100. Furthermore, assume that information indicating that a length of scanning lines formed by reflection surfaces A1 and B1 of the polygon mirror 200 is shorter by 10% than the reference value, and that of scanning lines formed by reflection surfaces C1 and D1 is longer by 10% than the reference value is saved in the memory 402. In this case, assuming that sync signals are output from the photosensor 202, as shown in FIG. 8, it can be determined that a section in which a count value of light detection intervals of the photosensor 202 is 90 corresponds to the reflection surface A1 or B1, and a section in which a count value is 110 corresponds to the reflection surface C1 or D1. Note that in this example, the reflection surfaces A1 and B1 have the same length, and the reflection surfaces C1 and D1 have the same length. However, this is merely an example, and the lengths of the four reflection surfaces may be respectively different. In this embodiment, only one photosensor 202 is used. Alternatively, the photosensors 202 may be respectively arranged at positions corresponding to a position before the beginning of a scan and that after the end of the scan, thereby detecting a length of a scanning line.

As described above, in order to correct a deviation amount of a length of a scanning line formed by each reflection surface of the polygon mirror 200, the number of pulses of a PWM signal corresponding to image data is increased/decreased by the number of pulses according to the deviation amount, thereby suppressing scanning line length variations caused by respective reflection surfaces of the polygon mirror 200. As a result, moiré can be reduced. For this reason, the constrained condition in screen design is relaxed, thus increasing degrees of freedom in screen design. Also, in FIGS. 7A to 7C, the image controller 340 executes pixel piece insertion/deletion by dividing a scanning line into segments as many as the number of minimum width pulses corresponding to the deviation amount. However, the present invention is not limited to this. For example, the image controller 340 divides a PWM signal corresponding to image data of each scan into a plurality of continuous regions, and increases or decreases at least one minimum width pulse in each region, thereby compensating for a deviation amount. More specifically, when nine minimum width pulses have to be deleted, the image controller 340 can divide a PWM signal corresponding to image data for that scan into four segments. Then, the image controller 340 deletes two minimum width pulses from each of three out of these segments, and deletes three minimum width pulses from the remaining one segment. Note that the embodiment using the color image forming apparatus has been described. Alternatively, this embodiment is applicable to a monochrome image forming apparatus. Furthermore, this embodiment is similarly applicable to an arrangement in which a laser beam is scanned by swinging a movable member which has a mirror on its reflection surface in place of the polygon mirror 200.

(Second Embodiment)

The second embodiment will be described below while focusing on differences from the first embodiment. This embodiment relates to a case in which exposure sizes of respective colors are different; that is, magnification components are generated in addition to length deviations of scanning lines formed by the reflection surfaces of the polygon mirror 200. Note that the arrangements of the respective units of the image forming apparatus are the same as those in the first embodiment.

Figure 9A:
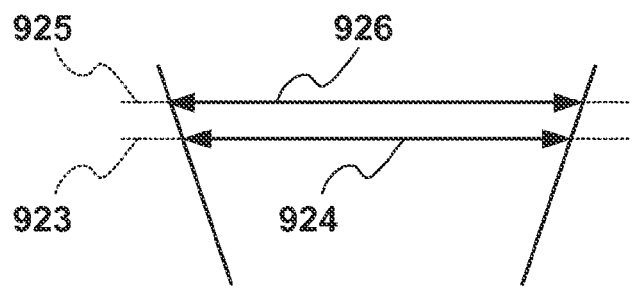
FIGS. 9A to 9C are explanatory views of an overall magnification deviation.

FIG. 9A is an explanatory view of an overall magnification deviation as one of magnification deviations. The overall magnification deviation means a deviation generated when an optical path length from the scanning unit 124 to the photosensitive member 122 similarly changes on respective portions of the photosensitive member 122. Such deviation is generated when the attachment positions/position of the photosensitive member 122 and/or the scanning unit 124 are/is deviated from reference attachment positions/position. A deviation amount at that time is called an overall magnification component. In FIG. 9A, a reference numeral 923 denotes an ideal attachment position of the photosensitive member 122; and a reference numeral 924 denotes a scanning line at the ideal attachment position. A reference numeral 925 denotes an actual attachment position of the photosensitive member 122; and a reference numeral 926 denotes a scanning line at the actual attachment position. That is, FIG. 9A shows a state in which the photosensitive member 122 is attached to be shifted to the side at which its optical path length is prolonged to be parallel to the ideal attachment state. Therefore, in FIG. 9A, the length of the scanning line 926 is longer than that of the scanning line 924 as a reference value. In this case, a ratio of the length of the scanning line 926 to that of the scanning line 924 will be referred to as an overall magnification hereinafter.

Figure 9B:
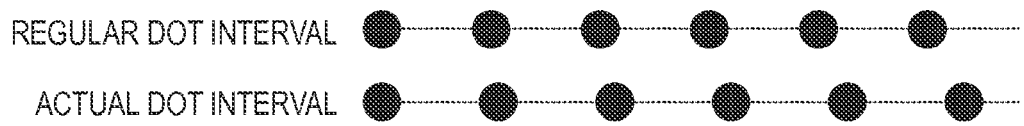
Figure 9C:
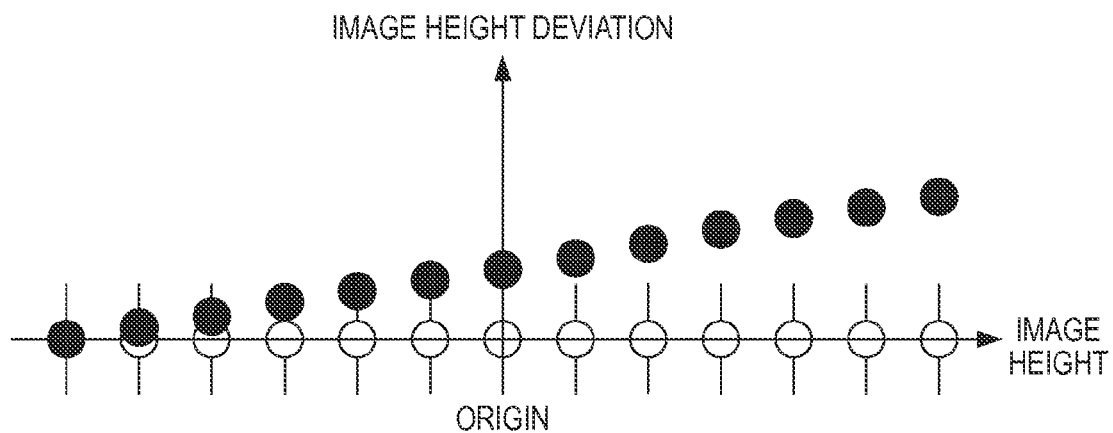

In this case, as shown in FIG. 9B, a pixel interval of the scanning line 926 is extended by the overall magnification compared to that of the ideal scanning line 924. FIG. 9C shows the relationship between an image height and image height deviation due to the overall magnification deviation. Note that the image height is an ideal main scan direction position, and the image height deviation means a deviation from the ideal position. The abscissa in FIG. 9C plots the image height, and an origin of the abscissa is the central position of the photosensitive member 122 in the main scan direction. A negative region on the abscissa corresponds to a side closer to a scan start position than the central position, and a positive region on the abscissa corresponds to a side closer to a scan end position than the central position. Also, the ordinate plots a deviation amount from the image height in the main scan direction. Note that a positive direction of the ordinate indicates that an exposure position is deviated toward the scan end position side, and a negative direction of the ordinate indicates that an exposure position is deviated toward the scan start position side.

In this case, a tilt of a graph showing the deviation amount in FIG. 9C represents an overall magnification. For example, assume that a position at the left end of FIG. 9C is the image height −105 mm, and an image height deviation amount at that position is adjusted to 0 mm. Also, assume that a position at the right end is the image height +105 mm, and an image height deviation amount indicates +0.021 mm. In this case, a length of a scanning line is 210 mm, and an image height deviation amount is +0.021 mm. That is, since a practical scan length is 210.021 mm with respect to an ideal scan length =210 mm, the overall magnification is 100.01%.

In this embodiment, the overall magnification is corrected to decrease the image height deviation shown in FIG. 9C. For example, assume that a resolution is 600 DPI, and a bit width of PWM control is 4 bits; that is, a width of a minimum width pulse is about 0.0028 mm, as in the first embodiment. In this case, the number of minimum width pulses corresponding to a length of 0.021 mm is 0.021/0.0028≈8 pulses. In this case, one scanning line is divided into eight segments, and one minimum width pulse can be deleted in each segment. After that, as described in the first embodiment, length deviations of scanning lines of the respective reflection surfaces of the polygon mirror 200 are corrected. For example, when the numbers of minimum width pulses to be inserted/deleted for the respective reflection surfaces are as shown in FIG. 7A, each scanning line is divided into four segments, and minimum width pulses can be inserted/deleted, as shown in FIG. 7C. Note that information indicating a deviation amount (second deviation amount) of a scanning line length from the reference value due to the overall magnification is measured in advance and saved in the memory 402. Also, in order to avoid insertion/deletion positions of minimum width pulses from being concentrated in a certain range, insertion/deletion positions of minimum width pulses required for correction of scan length deviations of the polygon mirror 200 need only be separated from those of minimum width pulses inserted/deleted for magnification correction as farther as possible.

Note that a total deviation amount of that caused by the overall magnification and those of scan lengths caused by the reflection surfaces of the polygon mirror 200 may be calculated in advance, and minimum width pulses corresponding to the total deviation amount may be inserted/ deleted. That is, assume that the deviation amount from the reference value due to the overall magnification is 0.021 mm, as described above, and those caused by the reflection surfaces of the polygon mirror 200 are as shown in FIG. 7B. In this case, a total deviation amount for reflection surfaces A and B is +0.0105 mm, and that for reflection surfaces C and D is +0.0315 mm. Therefore, for the reflection surfaces A and B, 0.0105/0.0028≈4 pulses are deleted. For the reflection surfaces C and D, 0.0315/0.0028≈11 pulses are deleted. Therefore, for the reflection surfaces A and B, a PWM signal is divided into four segments, and one pulse is deleted from each segment. For the reflection surfaces C and D, a PWM signal is divided into 11 segments, and one pulse is deleted from each segment.

Note that the overall magnification may be corrected by adjusting a frequency of a PWM signal, and scanning line variations of the polygon mirror 200 may be corrected by pixel piece insertion/deletion.

Figure 10A:
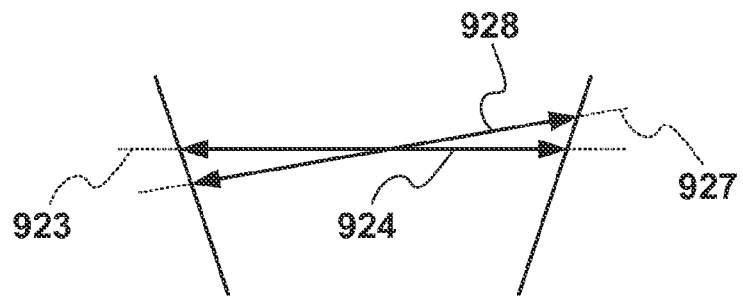
FIGS. 10A to 10C are explanatory views of a partial magnification deviation.
Figure 10B:
Figure 10C:
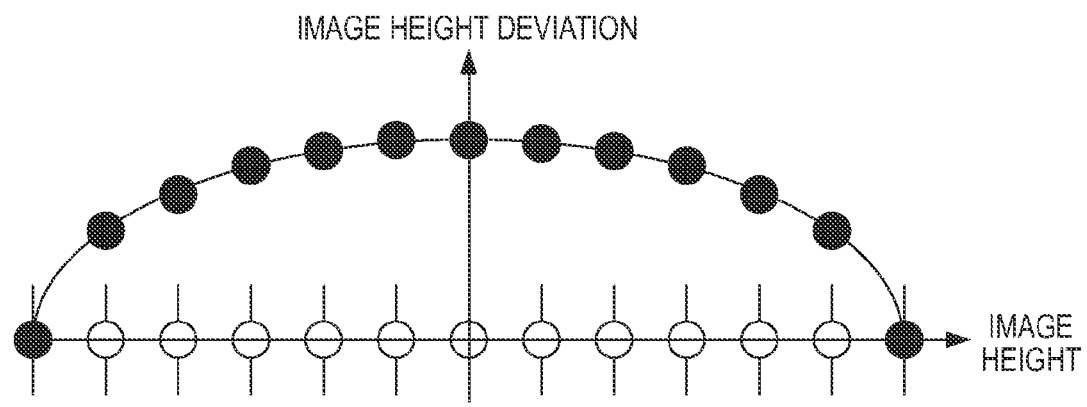

FIGS. 10A to 10C are explanatory views of a partial magnification deviation. In FIG. 10A, a reference numeral 923 denotes an ideal attachment position of the photosensitive member 122; and a reference numeral 924 denotes a scanning line at the ideal attachment position. A reference numeral 927 denotes an actual attachment position of the photosensitive member 122; and a reference numeral 928 denotes a scanning line at the actual attachment position. In FIG. 10A, the photosensitive member 122 is attached to have a certain angle with respect to the ideal attachment position. Therefore, a deviation of the optical path length to the photosensitive member 122 from an ideal optical path length changes according to an image height. That is, assuming that the left side of FIG. 10A is the scan start position, the optical path length at the scan start position of the photosensitive member 122 is shorter than the ideal optical path length, and that at the scan end position is longer than the ideal optical path length.

In this case, as shown in FIG. 10B, a pixel interval of the scanning line 928 is gradually broadened from the scan start position to the scan end position. More specifically, actual exposure positions are defined by a quadratic function of ideal exposure positions. FIG. 10C shows the relationship between an image height and image height deviations when the partial magnification deviation has occurred, and pixel intervals are uniformly corrected so that the scan start and end positions match ideal positions.

The reason why the relationship between the image height and image height deviations is as shown in FIG. 10C due to occurrence of the partial magnification deviation will be explained below. For example, a case will be examined wherein an actual exposure position becomes $$\text{actual exposure position}=0.13x^2$$

with respect to an ideal exposure position x in the main scan direction. In this case, assume that x=0 is the scan start position, that is, the leftmost position in FIG. 10C. Assuming that the scan end position in the main scan direction is given by x=10, x=13 becomes an actual end position due to the partial magnification deviation. When an actual position is uniformly corrected by multiplying it by (1/1.3) so that this actual end position is set at x=10, we have:

$$\text{corrected exposure position}=0.1x^2$$

Therefore, a deviation from an ideal position, that is, an image height deviation is expressed as a graph of a quadratic function shown in FIG. 10C with respect to the image height, as given by:

$$\text{Image height deviation}=x-0.1x^2$$

In the above description, the image height deviations match the shape of the quadratic function graph. However, actual image height deviations do not match the shape of the quadratic function graph, but often roughly match. That is, the image height deviations are not limited to the shape defined by the quadratic function.

When partial magnification components are generated, correction is made to decrease the deviation amounts shown in FIG. 10C in the same manner as that for overall magnification components, and after that, scan length deviations caused by the reflection surfaces of the polygon mirror 200 are corrected by inserting/deleting pixel pieces. As described above, according to this embodiment, magnification correction is executed, and scanning line length variations caused by the reflection surfaces of the polygon mirror are then corrected, thus deleting misregistration between colors, and reducing moiré.

(Third Embodiment)

In the first and second embodiments, a laser beam generated by one semiconductor laser 209 is scanned. In this embodiment, a plurality of laser beams generated by a plurality of semiconductor lasers 209 are used. Note that a case will be exemplified below wherein two laser beams are used.

Figure 11:
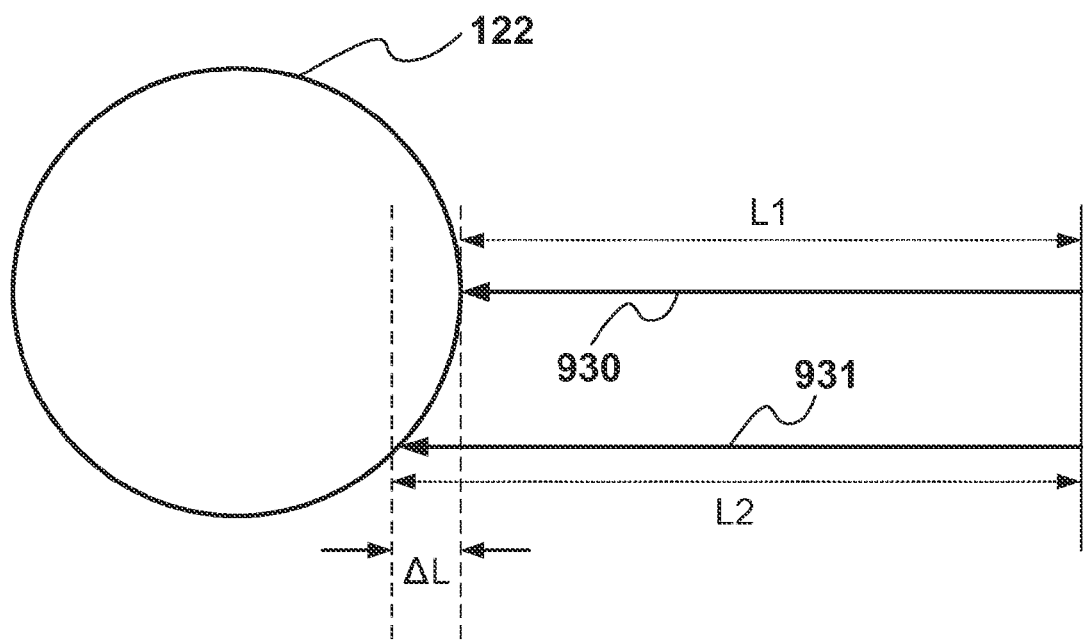
FIG. 11 is an explanatory view of different lengths of scanning lines formed by different laser beams.

In FIG. 11, a laser beam 930 has an optical path length L1, and a laser beam 931 has an optical path length L2. As shown in FIG. 11, the lengths L1 and L2 do not assume the same value according to the shape of the photosensitive member 122 and, hence, a scanning line length of the laser beam 930 is different from that of the laser beam 931. This is the same situation as that when the overall magnification deviation described in the second embodiment has occurred. Therefore, in this embodiment, one of the plurality of semiconductor lasers 209 is used as a first light source, and the remaining semiconductor laser 209 is used as a second light source. Then, a scanning line length of a scan by a laser beam from the first light source is used as a reference value, and a scanning line of a scan by a laser beam from the second light source suffers an overall magnification deviation, thus executing the correction as in the second embodiment.

FIGS. 12A to 12C are explanatory views of correction with reference to the laser beam 930 in FIG. 11. Note that the scanning line length of the laser beam 931 shown in FIG. 11 is 1.000026 times of that of the reference laser beam 930, as shown in FIG. 12A. Also, information indicating a deviation amount (third deviation amount) from the reference value is measured in advance, and is saved in the memory 402. Assuming that a minimum width pulse≈0.0028 mm, and an ideal scanning line length is 210 mm (corresponding to A4), as in the first embodiment, the deviation amount shown in FIG. 12A roughly corresponds to two minimum width pulses. Also, assume that the numbers of minimum width pulses to be inserted/deleted for the respective reflection surfaces of the polygon mirror 200 with four reflection surfaces are as shown in FIG. 12B. In this case, the numbers of minimum width pulses to be inserted/deleted of the laser beams 930 and 931 with respect to the respective reflection surfaces of the polygon mirror 200 are as shown in FIG. 12C. By inserting/deleting minimum width pulses, as shown in FIG. 12C, a change in scanning line length due to different optical path lengths of the plurality of laser beams and a change in scanning line length due to the polygon mirror can be suppressed, and moiré can be reduced.

(Fourth Embodiment)

An image forming apparatus often executes image formation by changing a print processing speed depending on print materials. At this time, a method of decreasing a moving speed in the sub-scan direction to be lower than a normal speed without changing the scan speed in the main scan direction by the scanning unit 124 is known. With this method, scans are made by skipping some reflection surfaces in place of scans made using respective reflection surfaces of the polygon mirror 200 in turn. For example, when the speed in the sub-scan direction is decreased to ½, scans are made by skipping every other reflection surface; when the speed in the sub-scan direction is decreased to ⅓, and when a scan is made using one reflection surface, the next scan is made by skipping the two continuous reflection surfaces. That is, the use pattern of the reflection surfaces of the polygon mirror 200 when the speed in the sub-scan direction is decreased to ½ is repetition of "use" and "nonuse", and that of the reflection surfaces of the polygon mirror 200 when the speed is decreased to ⅓ is repetition of "use", "nonuse", and "nonuse". In this embodiment, the image controller 340 discriminates the reflection surfaces of the polygon mirror 200 based on the information shown in FIG. 7A or 7B, and information indicating the use pattern of the reflection surfaces of the polygon mirror 200. Then, the image controller 340 generates a PWM signal to be output to the scanning unit 124 based on the deviation amounts of the discriminated reflection surfaces.

Figure 13:
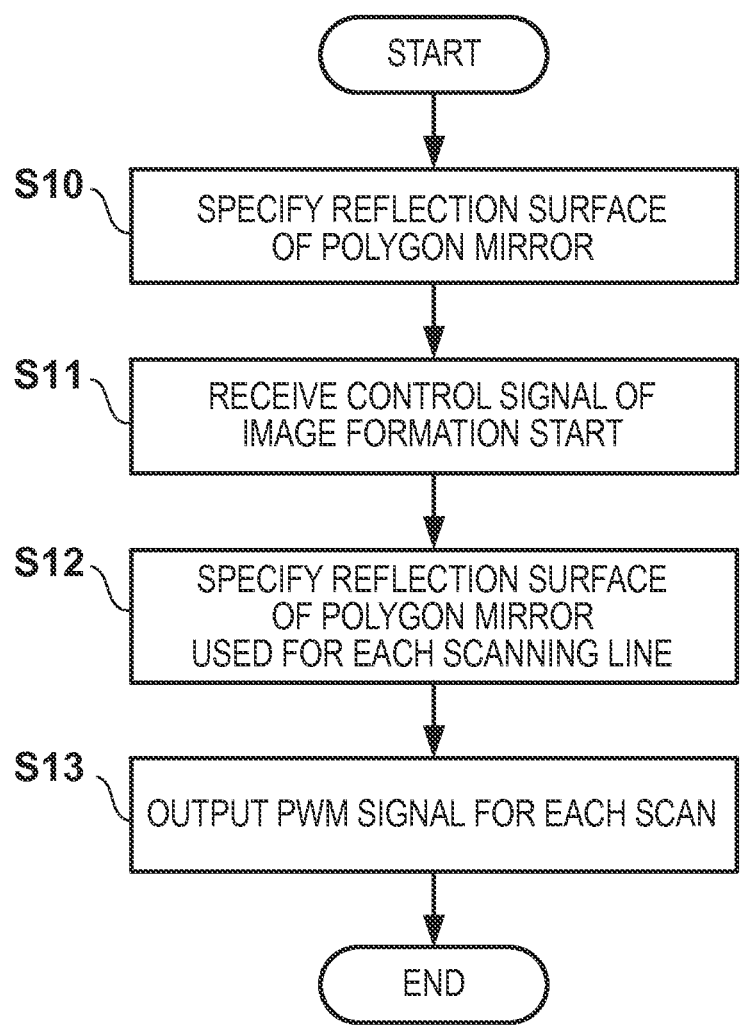
FIG. 13 is a flowchart of processing executed by the image controller according to an embodiment.

FIG. 13 is a flowchart of the processing in the image controller 340 according to this embodiment. Note that the following description will be given under the assumption that the speed is decreased to 1/M (M is a natural number not less than 2), and M is set in advance in the image controller 340 or is designated via an input/output unit (not shown). Upon starting print processing with the speed to be decreased to 1/M, the image controller 340 specifies a rotation state of the reflection surfaces of the polygon mirror 200 by the method described using FIG. 8 based on the sync signals from the scanning unit 124 in step S10. That is, the image controller 340 determines use timings of the respective reflection surfaces in scans. Upon reception of a control signal which notifies image formation start from the engine controller 341 in step S11, in step S12, the image controller 340 specifies reflection surfaces of the polygon mirror 200 used for respective scanning lines based on the timing determined in step S11.

For example, assume that the reflection surfaces of the polygon mirror 200 are four reflection surfaces with Nos. 0 to 3, and numbers are assigned to scanning lines in a scan order in turn from No. 0. In this case, letting L be the reflection surface No. used for a scanning line No. 0, No. A of a reflection surface of the polygon mirror 200 used for a scanning line of No. K is given by:

$$A=(L+M \cdot K) \bmod 4$$

Note that a reflection surface used for the first scanning line can be determined based on the reception timing of the control signal in step S11, and the use timings of the respective reflection surfaces used in scans are specified in step S10. In this manner, the image controller 340 can specify reflection surfaces used to scan respective scanning lines required to form one page in step S12. After that, in step S13, the image controller 340 generates pulse signals in which deviation amounts caused by the specified reflection surfaces are corrected for the specified scanning lines, and outputs the generated pulse signals to the scanning unit 124.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-266272, filed Dec. 5, 2011, which is hereby incorporated by reference herein in its entirety.

What is claimed is:

1. An image forming apparatus comprising:
    a photosensitive member;
    a scanning device including a light source configured to emit a laser beam and a polygon mirror formed with a plurality of reflection surfaces, the scanning device configured to scan the photosensitive member with the laser beam by reflecting the laser beam by the reflection surfaces of the rotating polygon mirror;
    a generating device configured to generate a pulse signal required to modulate the laser beam based on image data, and to output the pulse signal to the scanning device; and
    a storage unit configured to store information associated with a deviation amount between a length of a scanning line formed by each reflection surface of the plurality of reflection surfaces and a reference value,
    wherein the generating device is further configured to generate the pulse signal by inserting or deleting one or more pulses each having a width smaller than a width corresponding to one pixel of the image data into or from a pulse signal corresponding to the image data based on the information stored in the storage unit, so as to adjust lengths of scanning lines formed by the plurality of reflection surfaces to be closer to the reference value,
    wherein the generating device is further configured to divide one scanning line into a plurality of segments, and to insert or delete one or more pulses each having the width smaller than the width corresponding to one pixel of the image data into or from each segment, and
    wherein a number of the segments of the scanning line is determined based on a number of pulses to be inserted into or to be deleted from the scanning line.

2. The apparatus according to claim 1, wherein the generating device is further configured to randomly select one or more positions that the one or more pulses each having the width smaller than the width corresponding to one pixel of the image data are inserted or deleted into or from each segment.

3. The apparatus according to claim 1, wherein the generating device is further configured to generate the pulse signal by further inserting or deleting one or more pulses each having a width smaller than the width corresponding to one pixel of the image data into or from the pulse signal corresponding to the image data based on information associated with a second deviation amount as a deviation amount between a scanning line length and the reference value caused by a deviation of an attachment position of the scanning device with respect to the photosensitive member.

4. The apparatus according to claim 1, wherein the scanning device comprises a first light source and a second light source, which respectively emit a first laser beam and a second laser beam with which the photosensitive member is scanned,
    wherein the generating device is further configured to generate the pulse signal by further inserting or deleting one or more pulses having a width smaller than the width corresponding to one pixel of the image data into or from the pulse signal corresponding to the image data for modulating the second laser beam based on information associated with a third deviation amount as a deviation amount of a length of a scanning line formed by the second light source with respect to a length of a scanning line formed by the first light source.

5. The apparatus according to claim 1, wherein the generating device is further configured to generate the pulse signal corresponding to the image data by executing pulse width modulation based on data corresponding to respective pixels of the image data.

6. The apparatus according to claim 1, wherein the information associated with the deviation amount between the length of the scanning line formed by each reflection surface of the plurality of the reflection surfaces and the reference value is information indicating a number of pulses to be inserted or deleted by the generating device.

7. The apparatus according to claim 1, wherein the scanning device comprises a photodetection device configured to detect a laser beam reflected by the plurality of reflection surfaces, and the generating device is further configured to discriminate a reflection surface used in a scan of the laser beam based on detection time intervals of the laser beam by the photodetection device.

8. The apparatus according to claim 1, wherein a number of the segments of the scanning line is less than or equal to a number of pulses each having the width smaller than the width corresponding to one pixel of the image data, which is inserted or deleted from the scanning line.

9. The apparatus according to claim 1, wherein a number of the segments of the scanning line is determined based on the deviation amount of the scanning line.

10. An image forming apparatus comprising:
a photosensitive member;
a scanning device including a light source configured to emit a laser beam and a polygon mirror formed with a plurality of reflection surfaces, the scanning device configured to scan the photosensitive member with the laser beam by reflecting the laser beam by the reflection surfaces of the rotating polygon mirror;
a generating device configured to generate a pulse signal required to modulate the laser beam by executing pulse width modulation based on data corresponding to respective pixels of image data, and to output the pulse signal to the scanning device; and
a storage unit configured to store information associated with a deviation amount between a length of a scanning line formed by each reflection surface of the plurality of reflection surfaces and a reference value,
wherein the generating device is further configured to generate the pulse signal based on the information stored in the storage unit by inserting or deleting one or more pulses into or from a pulse signal corresponding to the image data, so as to adjust lengths of scanning lines formed by the plurality of reflection surfaces to be closer to the reference value,
wherein the generating device is further configured to divide one scanning line into a plurality of segments, and to insert or delete one or more pulses into or from each segment, and
wherein a number of the segments of the scanning line is determined based on a number of pulses to be inserted into or to be deleted from the scanning line.

11. The apparatus according to claim 10, wherein the generating device is further configured to randomly select one or more positions that the one or more pulses are inserted or deleted into or from each segment.

12. The apparatus according to claim 10, wherein the generating device is further configured to generate the pulse signal based on a second deviation amount as a deviation amount between a scanning line length and the reference value caused by a deviation of an attachment position of the scanning device with respect to the photosensitive member by further inserting or deleting one or more pulses corresponding to the second deviation amount into or from the pulse signal corresponding to the image data.

13. The apparatus according to claim 10, wherein the scanning device comprises a first light source and a second light source, which respectively emit a first laser beam and a second laser beam with which the photosensitive member is scanned,
wherein the generating device is further configured to generate the pulse signal based on information associated with a third deviation amount as a deviation amount of a length of a scanning line formed by the second light source with respect to a length of a scanning line formed by the first light source by further inserting or deleting one or more pulses corresponding to the third deviation amount into or from the pulse signal corresponding to the image data for modulating the second laser beam.

14. The apparatus according to claim 10, wherein the information associated with the deviation amount between the length of the scanning line formed by each reflection surface of the plurality of reflection surfaces and the reference value is information indicating a number of pulses to be inserted or deleted by the generating device.

15. The apparatus according to claim 10, wherein the scanning device comprises a photodetection device configured to detect a laser beam reflected by the plurality of reflection surfaces, and the generating device is further configured to discriminate a reflection surface used in a scan of the laser beam based on detection time intervals of the laser beam by the photodetection device.

16. The apparatus according to claim 10, wherein a number of the segments of the scanning line is less than or equal to a number of pulses, which are inserted or deleted from the scanning line.

17. The apparatus according to claim 10, wherein a number of the segments of the scanning line is determined based on the deviation amount of the scanning line.

* * * * *